Oct. 8, 1968 R. S. TILTON 3,405,333
TEMPERATURE COMPENSATING TRIMMER CAPACITOR FOR USE IN
CRYSTAL OSCILLATOR CIRCUITS
Filed Jan. 13, 1967
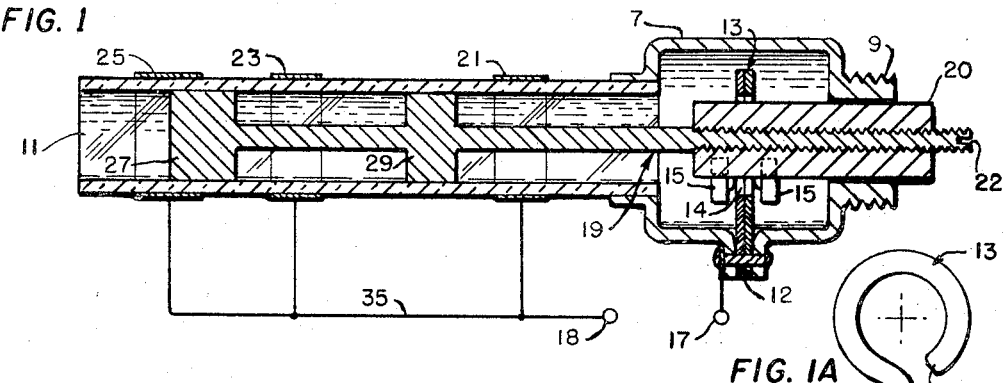
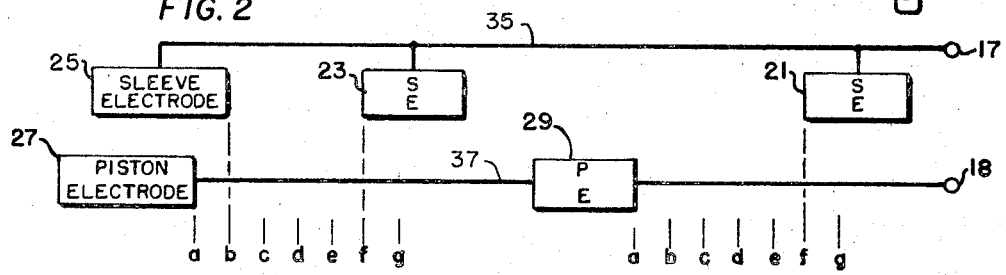
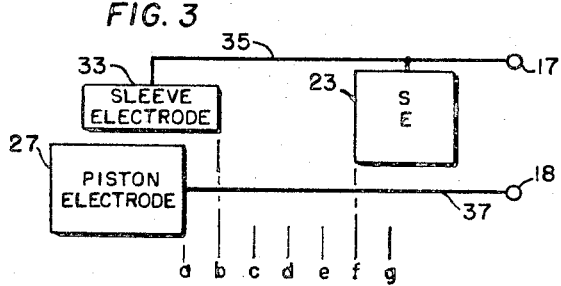
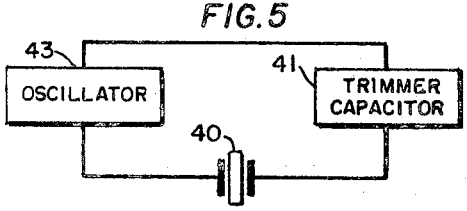
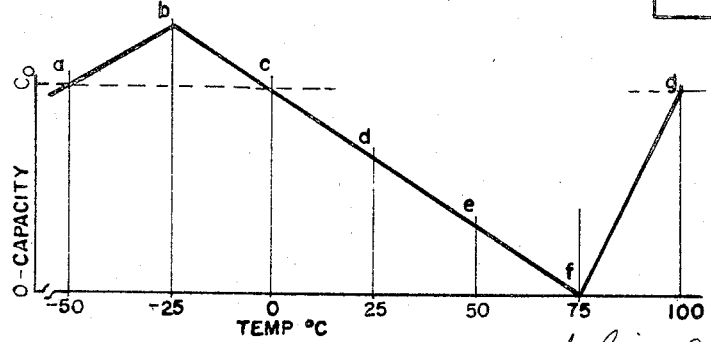
INVENTOR.
RICHARD S. TILTON.
BY Harry M. Saragovitz
Edward J. Kelly
Herbert Berl
Julian C. Keppler
ATTORNEYS

United States Patent Office 3,405,333
Patented Oct. 8, 1968

3,405,333
TEMPERATURE COMPENSATING TRIMMER CAPACITOR FOR USE IN CRYSTAL OSCILLATOR CIRCUITS
Richard S. Tilton, 29 Sagmore Ave., Oceanport, N.J. 07757
Filed Jan. 13, 1967, Ser. No. 609,728
7 Claims. (Cl. 317—248)

ABSTRACT OF THE DISCLOSURE

A sleeve and piston type trimmer capacitor comprising a plurality of sleeve electrodes mounted on a dielectric sleeve and one or more piston electrodes which are moveable within the dielectric sleeve to vary the capacity between the piston and sleeve electrodes. The piston electrodes are moved along the inside of the dielectric sleeve by a temperature-responsive means such as a bimetallic strip. Two arrangements of the electrodes are shown which result in a curve of temperature versus capacity which is generally sinuous. Such a capacitor is useful for temperature compensating crystal oscillators.

---

The present invention relates to a temperature compensating trimmer capacitor and more particularly to a temperature-responsive trimmer capacitor which exhibits a temperature versus capacity characteristic which makes it useful in piezoelectric crystal oscillator circuits for compensating for the change in frequency of oscillation with ambient temperature. The capacitor is connected in the oscillator circuit and the change in capacity of the trimmer with ambient temperature changes the oscillator frequency in a direction opposite to the frequency change caused by the effect of the temperature change on the oscillator crystal, thus providing a highly stable oscillator without the need for temperature stabilized ovens or expensive temperature-insensitive crystals. A certain type of moderately priced crystals requires a temperature compensating capacitor which exhibits a generally sinuous variation of capacity with temperature, comprising first a positive temperature coefficient of capacity, followed by a region of negative temperature coefficient of capacity, and at the highest expected ambient temperatures a sharp rise in capacity with temperature. The trimmer capacitor disclosed herein provides such a capacity versus temperature characteristic.

It is thus an object of this invention to provide a novel temperature compensating trimmer capacitor.

Another object of this invention is to provide a crystal oscillator with an inexpensive temperature compensating means.

A further object is to provide a trimmer capacitor which exhibits a generally sinuous variation in capacity with ambient temperature.

These and other objects and advantages of the present invention will become apparent from the following detailed description and drawings, in which:

FIGURE 1 is one embodiment of an illustrative trimmer capacitor constructed according to the present invention.

FIGURE 1A is a detail view of a bimetallic element which may be used to actuate the trimmer capacitor of FIGURE 1.

FIGURES 2 and 3 illustrate two electrode arrangements which may be used with the capacitor of FIGURE 1 to achieve the desired variation of capacity with ambient temperature.

FIGURE 4 is the curve of capacity versus temperature resulting from the electrode arrangements of FIGURES 2 or 3.

FIGURE 5 shows how the trimmer of FIGURE 1 may be connected in circuit with a crystal oscillator to temperature compensate the crystal thereof.

The illustrative capacitor of FIGURE 1 is of the sleeve and piston type in which one or more stationary sleeve electrodes are attached to the outer surface of a dielectric sleeve, with one or more piston electrodes moveable longitudinally within the dielectric sleeve to vary the capacity between the sleeve electrodes and the piston electrodes. The hollow cylindrical dielectric sleeve 11 has mounted on the outside thereof three conductive sleeve electrodes 21, 23, and 25. In the embodiment of FIGURE 1 these three sleeve electrodes completely encircle the dielectric sleeve 11 at spaced intervals, and all three electrodes are electrically connected to lead 35 which in turn is connected to capacitor terminal 18. The right hand end of the dielectric sleeve 11 is supported in a mating hole in the hollow housing 7. The housing 7 has a threaded mounting stud 9 at its other end. An internally threaded sliding cylindrical member 20 is slidably received within a mating bore in the housing 7. The piston electrode carrier 19 has at its right hand end threads which engage the internal threads of the sliding member 20 and also a screwdriver slot 22, by means of which the relative positions of the piston electrodes and the sliding member 20 may be varied. A bimetallic element 13 is of arcuate shape, as seen in detail in FIGURE 1A, and has one end 12 anchored within a recess in the housing 7. The element 13 curves up and over the sliding member 20 and the free end 14 thereof is held between a pair of projections 15 which are secured to the member 20. The two piston electrodes 27 and 29 may form an integral part of the conductive piston electrodes carrier 19 or these electrodes may be separate parts securely and conductively connected to carrier 19. Electrical connection is made to the two piston electrodes from the terminal 17 via lead 37 which is connected to the anchored end of the element 13, thence through the projections 15, the sliding member 20 and the piston electrode carrier 19. Temperature changes will cause the free end 14 of the bimetallic element to move to the right or left depending on the sense of the temperature change, and thus also moving the sliding member and the piston electrodes. Thus all of the sleeve electrodes constitute one plate of the capacitor and all of the piston electrodes constitute the other plate, and the total capacity depends on how much of the areas of these two sets of electrodes are overlapping.

FIGURE 2 is a schematic diagram illustrating the relative positions of the electrodes of the capacitor of FIGURE 1, in developed form, that is, flattened out. Corresponding elements in FIGURES 1 and 2 bear the same reference characters. The letters $a$ through $g$ denote the position of the right hand end of the piston electrodes 27 and 29 at different temperatures. In order to achieve the desired variation of capacity with ambient temperature, which is illustrated by the curve of FIGURE 4, the capacitor is subjected to the lowest expected ambient temperature, which in the illustrated embodiment is $-55°$ C., and the piston electrodes are adjusted to the position $a$, by turning the piston electrode carrier 19 relative to the sliding member 20. At position $a$ or $-55°$ C. the capacity will be determined largely by the overlapping portions or areas of the electrodes 25 and 27, since the piston electrode 29, at position *a* is far removed from both of the sleeve electrodes 21 and 23. At the lowest expected ambient temperature the amount of overlap of the electrodes 25 and 27 is made approximately 75% so that the distance from position *a* to *b* of FIGURE 2 is approximately 25% of longitudinal dimension of the electrodes 25 and 27. As the ambient temperature rises to −25° C. the piston electrodes will be at position *b*, at which point the capacity between electrodes 25 and 27 will reach a maximum, and the capacity between the piston electrode 29 and the sleeve electrodes 21 and 23 will still be negligible. Further increase in temperature to 0° C. will cause the pistons to move to position *c*, thus decreasing the capacity to approximately its value at position *a*. The capacity continues to drop at a uniform rate as the temperature rises to +75° C., at which point the left end of piston electrode 27 is at position *b*, resulting in approximately zero capacity between electrodes 25 and 27. The spacing between the two sleeve electrodes 23 and 25 (*b* to *f*) is made the same as the longitudinal (or axial) extent of the piston electrode 27, and further the spacing between sleeve electrode 21 and piston electrode 29 (*a* to *f*) is made the same as the spacing (*a* to *f*) between sleeve electrode 23 and piston electrode 27. Therefore, at any temperature within the operating range, the spacing between piston electrode 27 and sleeve electrode 23 is the same as the spacing between piston electrode 29 and sleeve electrode 21. Thus, as the temperature rises above 75° C., piston electrode 27 will begin to overlap sleeve electrode 23 and piston electrode 29 will begin to overlap sleeve electrode 21. Since both pistons are now contributing to the increase in capacity with temperature, there will be a sharp rise in capacity between temperatures +75° C. and +100 (positions *f* to *g*). The rate of rise will be approximately twice the rate of decrease of capacity between positions *b* and *f*. Thus it is seen that the electrode arrangement, spacing, and adjustment of FIGURES 1 and 2 results in a capacitor with a positive temperature coefficient of capacity of a given magnitude over a first temperature range (−55 to −25° C.), an approximately equal but negative temperature coefficient of capacity over a second temperature range (−25 to +75° C.) which is about three times as great as the first temperature range, followed by a positive temperature coefficient of approximately twice the absolute value of the aforementioned temperature coefficients.

FIGURE 3 is a schematic diagram of an alternate electrode arrangement for the capacitor of FIGURE 1 which results in a similar variation of capacity with temperature. In this embodiment, only the single piston electrode 27 is utilized. In place of the sleeve electrode 25, which completely encircles the dielectric sleeve 11, the sleeve electrode 33 covers only half of the periphery of the dielectric sleeve. The second sleeve electrode 23 is the same as the correspondingly referenced electrode of FIGURES 1 and 2 in that it completely encircles the dielectric sleeve and is spaced from the sleeve electrode 33 by a distance (*b* to *f*) equal to the longitudinal extent of piston electrode 27. As in the electrode arrangement of FIGURE 2, the piston electrode is set at position *a* at the lowest expected ambient temperature. Temperature increase to position *b* will result in a positive temperature coefficient of capacity, temperature increase from positions *b* to *f* will result in a negative temperature coefficient of capacity of the same absolute value as the aforementioned positive temperature coefficient, as does the electrode arrangement of FIGURE 2. At position *f*, the piston electrode starts to overlap the sleeve electrode 23 and since this electrode has twice the peripheral dimension of sleeve electrode 33, the capacity will increase at twice the rate at which it decreased when the piston was moving between positions *b* and *f*. Thus it can be seen that the electrode arrangement of FIGURE 3 will yield a capacity versus temperature curve of the same general shape as that of FIGURE 2.

In FIGURE 5 is shown how a trimmer capacitor 41 of the type disclosed herein is connected in series with the frequency-controlling crystal 40 of an oscillator 43, for temperature compensating purposes. A second fixed trimmer capacitor may be connected in parallel to the temperature-responsive trimmer 41 to maintain a minimum value of capacity at all temperatures.

As mentioned above, the use of such a trimmer capacitor with moderately priced, temperature-sensitive crystals results in a highly stable oscillator over a wide range of ambient temperatures. While the capacitor has been illustrated as being actuated by an arcuate bimetallic strip, other temperature responsive means may be used, for example, a fluid-filled bellows which expands and contracts in response to temperature changes, as shown in Mermelstein et al. Patent 3,191,107. Further, the curve of FIGURE 4 illustrates the temperature compensation required for a particular crystal. Other crystals may require a capacity versus temperature curve of generally the same shape but with the maximum and minimum points *b* and *f* displaced somewhat on the temperature scale, or with different magnitudes of capacity at these points.

Other modifications of the invention will be apparent to those skilled in the art without departing from the inventive concepts disclosed herein, accordingly, the invention should be limited only by the scope of the appended claims.

What is claimed is:

1. A trimmer capacitor of the sleeve and piston type comprising, a dielectric sleeve with first, second and third conductive sleeve electrodes on the outer surface thereof at spaced intervals, first and second spaced pistons electrodes attached to a piston electrode carrier which is disposed within said dielectric sleeve, means responsive to the ambient temperature for longitudinally moving said piston electrodes within said dielectric sleeve, said electrodes being disposed such that said first of piston electrodes overlaps approximately 75% of the area of said first sleeve electrode at the lowest expected ambient temperature, the spacing between said first and second sleeve electrodes being equal to the longitudinal extent of said first piston electrode, the spacing between said first piston electrode and said second sleeve electrode at any temperature within the operating range being the same as the spacing between said second piston electrode and said third sleeve electrode, and wherein temperature increases will move said first piston electrode toward said third sleeve electrode.

2. The trimmer capacitor of the claim 1 wherein said means responsive to the ambient temperature comprises a bimetallic strip.

3. The trimmer capacitor of claim 1 wherein said piston electrodes are cylindrical in shape and said sleeve electrodes comprise metal bands completely encircling said dielectric sleeve.

4. The trimmer capacitor of claim 1 where all of said sleeve electrodes are electrically connected together to form one capacitor plate and both of said piston electrodes form the other plate of said capacitor.

5. A trimmer capacitor of the sleeve and piston type comprising, a dielectric sleeve with first and second conductive sleeve electrodes on the outer surface thereof at spaced intervals, a cylindrical piston electrode attached to a piston electrode carrier which is disposed within said dielectric sleeve, means responsive to ambient temperature for longitudinally moving said piston electrode within said dielectric sleeve, said electrodes being disposed such that said piston electrode overlaps approximately 75% of the area of said first sleeve electrode at the lowest expected ambient temperature, the spacing between said first and second sleeve electrodes being equal to the longitudinal extent of said piston electrode, said second sleeve electrode having twice the peripheral dimension of said first sleeve electrode, and wherein an increase in temperature will move said piston electrode toward said second sleeve electrode.

6. The trimmer capacitor of claim 5 wherein said first sleeve electrode covers half of the periphery of said dielectric sleeve and said second sleeve electrode covers the entire periphery thereof.

7. The trimmer capacitor of claim 6 wherein said means responsive to ambient temperature comprises a bimetallic strip.

References Cited
UNITED STATES PATENTS

| | | | |
|---|---|---|---|
| 2,589,092 | 3/1952 | Kihn | 317—249 |
| 3,214,656 | 10/1965 | Caron | 317—248 |
| 3,270,296 | 8/1966 | Aizawa | 317—248 X |
| 3,274,464 | 9/1966 | Seiden | 317—249 X |

LEWIS H. MYERS, *Primary Examiner.*

ELLIOTT A. GOLDBERG, *Assistant Examiner.*